_US006089352A_

United States Patent [19]
Kim et al.

[11] Patent Number: 6,089,352
[45] Date of Patent: Jul. 18, 2000

[54] OIL SUPPLY APPARATUS FOR LINEAR COMPRESSOR

[75] Inventors: Hyung Jin Kim; Ki Chul Choi, both of Seoul, Rep. of Korea

[73] Assignee: LG Electronics, Inc., Rep. of Korea

[21] Appl. No.: 09/099,619

[22] Filed: Jun. 18, 1998

[51] Int. Cl.⁷ ................................................ F01M 1/00
[52] U.S. Cl. ........................ 184/6.16; 184/32; 184/46; 417/211
[58] Field of Search .................. 184/6.16, 32, 46; 417/211, 467

[56] References Cited

U.S. PATENT DOCUMENTS

| | | | |
|---|---|---|---|
| 1,260,574 | 3/1918 | Pogue | 417/241 |
| 2,164,863 | 7/1939 | Babcock | 62/119.5 |
| 2,572,977 | 10/1951 | Bodine, Jr. | 103/43 |
| 3,136,257 | 6/1964 | Smith et el. | 103/53 |
| 4,406,587 | 9/1983 | Perry | 417/211 |

*Primary Examiner*—David M. Fenstermacher
*Attorney, Agent, or Firm*—Ostrolenk, Faber, Gerb & Soffen, LLP

[57] ABSTRACT

The present invention relates to an oil supply apparatus for a linear compressor in which elastic members are excluded, wherein oil contained in an oil supply unit is exhausted by inertia and flowed into an oil pocket which communicates with a friction portion between a cylinder and a piston in the process of which the oil supply unit reciprocates in accordance with the vibration of a compressor unit. Thus, the oil supply apparatus for the linear compressor has advantages of reducing manufacturing costs and improving the productivity. The oil supply apparatus for the linear compressor of the invention includes a compressor unit horizontally installed in a predetermined part of a hermetic vessel, and an oil supply means disposed at an outer side of the compressor unit for supplying oil contained therein to an oil pocket which communicates with a friction portion between a cylinder and a piston, which oil is exhausted by inertia due to straight reciprocation of the oil supply means in accordance with vibration of the compressor unit.

6 Claims, 6 Drawing Sheets

OIL SUPPLY APPARATUS FOR LINEAR COMPRESSOR

BACKGROUND OF THE INVENTION

1. Field of the Invention

The present invention relates to an oil supply apparatus for a linear compressor, and more particularly to an oil supply apparatus for a linear compressor which is cost effective and improves productivity by excluding elastic members and thus simplifying an assembly process.

2. Discussion of the Background

In order to improve the mechanical efficiency of compressors, there have been numerous studies for supplying sufficient amounts of oil to a friction portion between a cylinder and a piston.

Referring to FIGS. 1 and 2, an example of a conventional linear compressor provided with an oil supply unit will be described.

In FIG. 1, in a predetermined-shaped hermetic vessel C, a compressor unit 10 is horizontally disposed, and an oil supply unit 30 is fixedly installed at a lower side of the compressor unit 10.

An oil pocket P provided in the compressor unit 10 is connected to the oil supply unit 30, and through the oil pocket P, oil O is supplied to a friction portion on between a cylinder 11 and a piston 17.

More specifically, a piston spring 16 is provided at one side in the hermetic vessel C, and spring supporters 15 are respectively fixed to an upper and a lower portion of an inner side of the piston spring 16.

A rear-end portion of the piston 17 which is connected to magnets 18 as a single body is fixed to a center portion of the inner side of the piston spring 16.

The cylinder 11 is provided at an outer side of the piston 17 in order that the piston 17 may reciprocate therein. On a portion of an outer circumferential surface of the cylinder 11, there are provided a plurality of oil flow holes 11a that connect an outer and an inner sides of the cylinder 11, and an upper and a lower portions of the cylinder 11 are respectively fixed by a flange 12.

An inner lamination 13 is fixed to an inner wall of the flange 12, and a stator core (an outer lamination) 14 wherein a stator coil 14a is provided is fixed to a portion of an outer circumferential surface of the flange 12, having a predetermined interval with the inner lamination 13. Thus, the piston 17 properly operates between the inner lamination 13 and the stator core 14.

At the other side of the cylinder 11, a valve section 19 and a muffler 20 are fixedly provided, and a refrigerant gas flows through a refrigerant flow pipe 21 provided at one side of the muffler 20 into the valve section 19.

An oil flow path 12a provided in a predetermined portion of one side of the flange 12 has end portions which respectively communicate with the oil supply unit 30 and with one side of the oil pocket P, and the other side of the oil pocket P communicates with one end portion of an oil exhaust path 12b provided in a portion of the other side of the flange 12.

Now, the oil supply unit 30 applied to the conventional compressor will be described with reference to FIGS. 1 and 2.

An oil-mass 32 in which an oil path 32a is provided is inserted in a center portion of a cylindrical and hollow oil supply pipe 31, so that the oil-mass 32 may reciprocate in accordance with the vibration of the compressor unit 10.

A first cover 33 having an oil flow hole 33a in a predetermined portion thereof is fixed to an end portion of an oil flow side of the oil supply pipe 31, and is supported by a predetermined portion of the spring supporter 15 fixed to the lower portion of the inner side of the piston spring 16.

A second cover 34 having an inner oil exhaust hole 34a communicating with the oil flow path 12a of the flange 12 therein is fixedly coupled with an end portion of an oil exhaust side of the oil supply pipe 31, and is fixed to the flange 12 by a plurality of bolts (not shown).

Between the oil-mass 32 and the first cover 33, there are provided an oil flow valve 35 which selectively opens/closes the oil flow hole 33a of the first cover 33 and a flow-side elastic member 36 such as a compression coil spring which elastically supports the oil flow valve 35.

Similarly, between the oil-mass 32 and the second cover 34, there are provided an oil exhaust valve 37 which selectively opens/closes the inner oil exhaust hole 34a of the second cover 34 and an exhaust-side elastic member 38 which has the same material as the flow-side elastic member 36 and elastically supports the oil exhaust valve 37.

The oil pocket P, i.e. the space between the cylinder 11 and the flange 12, communicates with the inner part of the cylinder 11 through the oil flow holes 11a.

The numerals 39 and 39' are an oil flow tube and an oil exhaust tube, respectively.

The operation by which oil is supplied to the friction portion between the cylinder 11 and the piston 17 by means of the oil supply unit 30 disposed at the outer side of the compressor unit 10 of the oil supply apparatus of the conventional linear compressor is as follows.

First, the piston 17 continuously reciprocates in the cylinder 11 in accordance with general operation of a linear motor, causing flow, compression and exhaust of refrigerant gas to be repeatedly accomplished. At this time, when the compressor unit 10 vibrates in accordance with the continuous reciprocation of the piston 17, the oil-mass 32 inserted in the oil supply pipe 31 moves in the horizontal direction.

Specifically, when the oil supply pipe 31 moves in the direction Q, the oil exhaust valve 37 moves in the direction P, as shown in FIG. 2, as the exhaust-side elastic member 38 of the oil supply pipe 31 is compressed, as shown in FIG. 3A, and simultaneously the flow-side elastic member 36 with the oil flow valve 35 moves in the direction P, thus the oil flow valve 35 is separated from the first cover 33.

The pressure between the oil flow valve 35 and the oil exhaust valve 37 is lowered, and accordingly a certain amount of oil filled in a bottom part of the hermetic vessel C is flowed into the first cover 33 through the oil flow tube 39, and thereto into the oil path 32a of the oil-mass 32 passing through an oil pass groove (not shown) provided on a portion of an outer circumferential surface of the oil flow valve 35, for thereby filling the oil path 32a.

On the other hand, when the oil supply pipe 31 moves in the direction P, the oil flow valve 35 moves in the direction Q, as shown in FIG. 2 and thus is compressed to a side of the first cover 33, as the flow-side elastic member 36 of the oil supply pipe 31 is compressed, as shown in FIG. 3B.

At the same time, since the exhaust-side elastic member 38 and the oil exhaust valve 37 move in the direction Q in FIG. 2 and the oil exhaust valve 37 is separated from the oil-mass 32, oil filled in the oil path 32a of the oil-mass 32 is flowed into the oil pocket P, passing through an oil pass groove (not shown) formed on a portion of an outer circumferential surface of the oil exhaust valve 37 and through the oil flow path 12a of the flange 12. The oil flowed into the oil pocket P is the supplied into the cylinder 11 passing through the oil flow holes 11a and into the friction portion between the piston 17 and the cylinder 11.

While, a portion of the oil flowed into the oil pocket P is transferred through the oil exhaust path 12b in the flange 12 and externally exhausted through the oil exhaust tube 39'.

However, the conventional apparatus requires the elastic members at each end side of the oil-mass in order to allow the oil-mass to reciprocate in the oil supply pipe, thereby increasing the manufacturing costs. In addition, the first and second covers need to be compressedly inserted into the end portions of the elastic members when sufficient elasticity is given to the oil-mass, whereby the productivity is degraded due to difficulty of the fabrication.

SUMMARY OF THE INVENTION

Accordingly, an object of the present invention is to provide an oil supply apparatus for a linear compressor that improves productivity by simplifying the assembly process.

Another object of the present invention is to provide an oil supply apparatus for a linear compressor that is cost effective by excluding elastic members.

A further object of the present invention is to provide an oil supply apparatus for a linear compressor wherein oil contained in an oil supply pipe can be flowed and exhausted in accordance with inertia due to vibration of a compressor unit in the process of a horizontal movement of an oil supply pipe.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as in the appended drawings.

To achieve these and other advantages and in accordance with the purpose of the present invention, as embodied and broadly described, an oil supply apparatus for a linear compressor includes: a compressor unit horizontally installed in a predetermined part of a hermetic vessel; and an oil supply unit disposed at an outer side of the compressor unit for supplying oil contained therein to an oil pocket which communicates with a friction portion between a cylinder and a piston, which oil is exhausted by inertia due to straight reciprocation of the oil supply means in accordance with vibration of the compressor unit.

It is to be understood that both the foregoing general description and the following detailed description are exemplary and explanatory and are intended to provide a further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

A linear compressor provided with an oil supply apparatus according to the present invention has the same structure as the conventional art, except for the oil supply apparatus. Thus, the structure of the oil supply apparatus will be described in detail.

Figure 1:
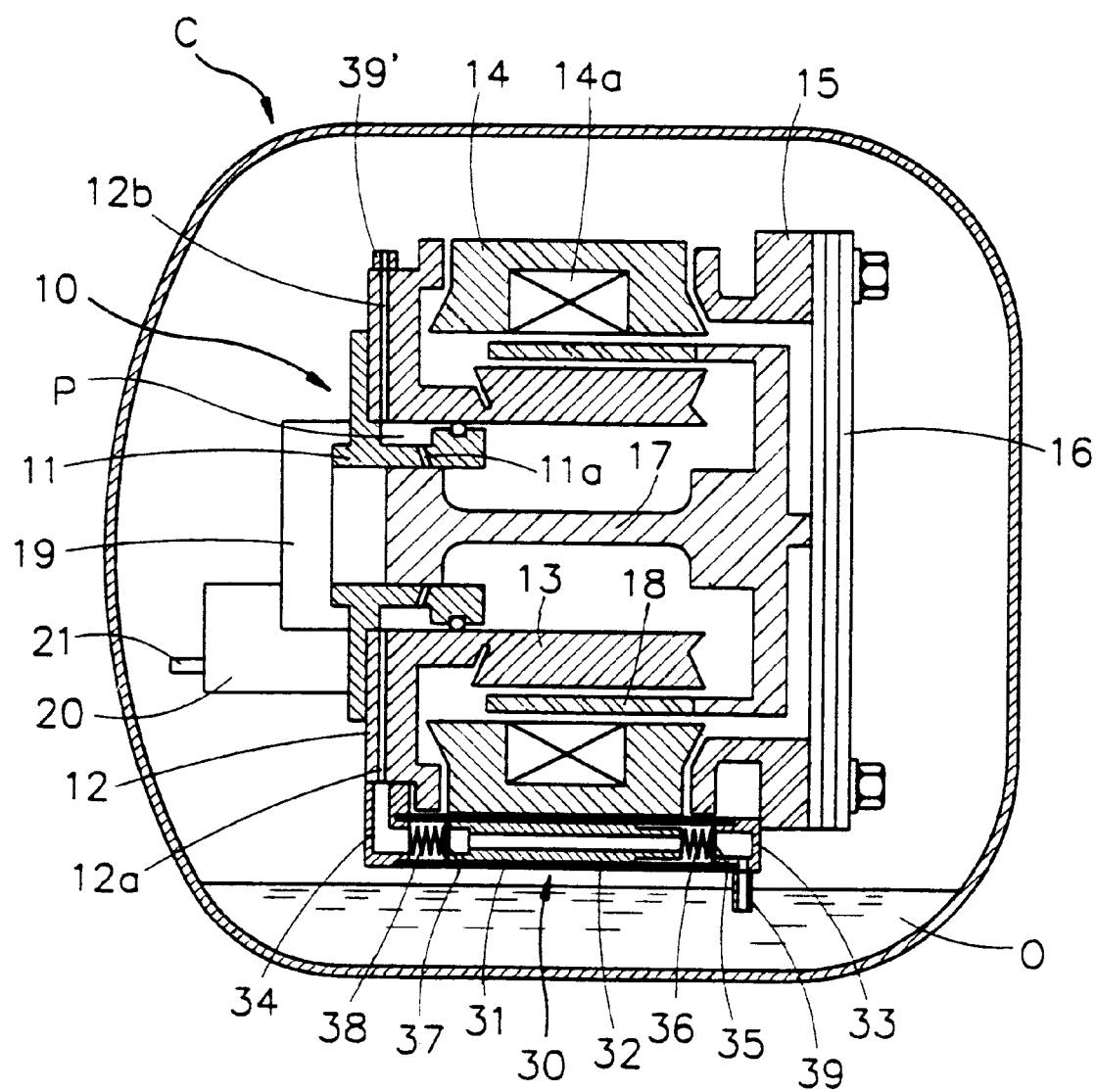
FIG. 1 is a vertical cross-sectional view of a linear compressor provided with a conventional oil supply apparatus.
Figure 2:
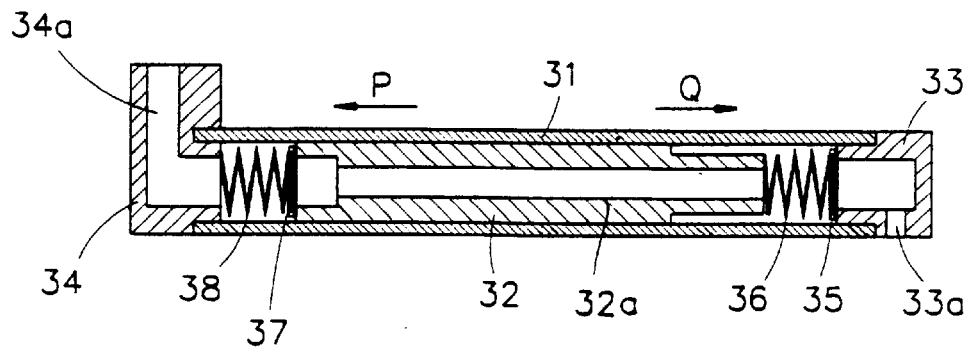
FIG. 2 is a vertical cross-sectional view of the conventional oil supply apparatus in FIG. 1.
Figure 3A:
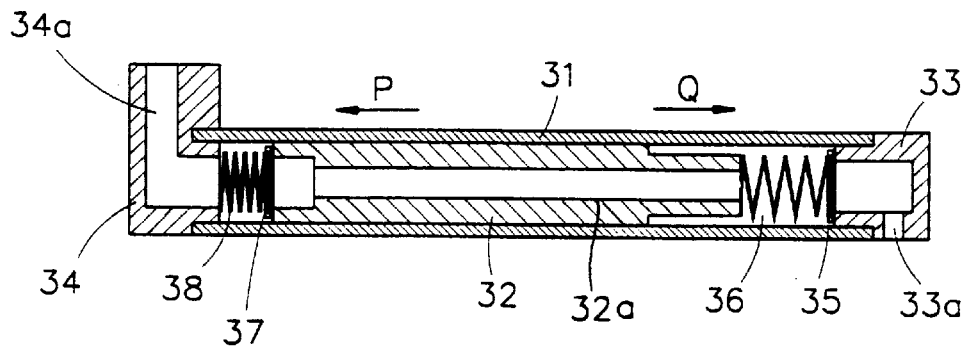
FIG. 3A is a vertical cross-sectional view illustrating an oil flow state of the conventional oil supply apparatus.
Figure 3B:
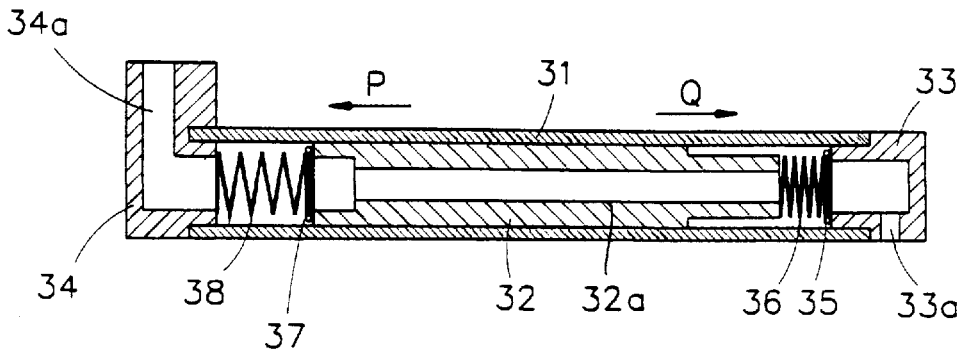
FIG. 3B is a vertical cross-sectional view illustrating an oil exhaust state of the conventional oil supply apparatus.
Figure 4:
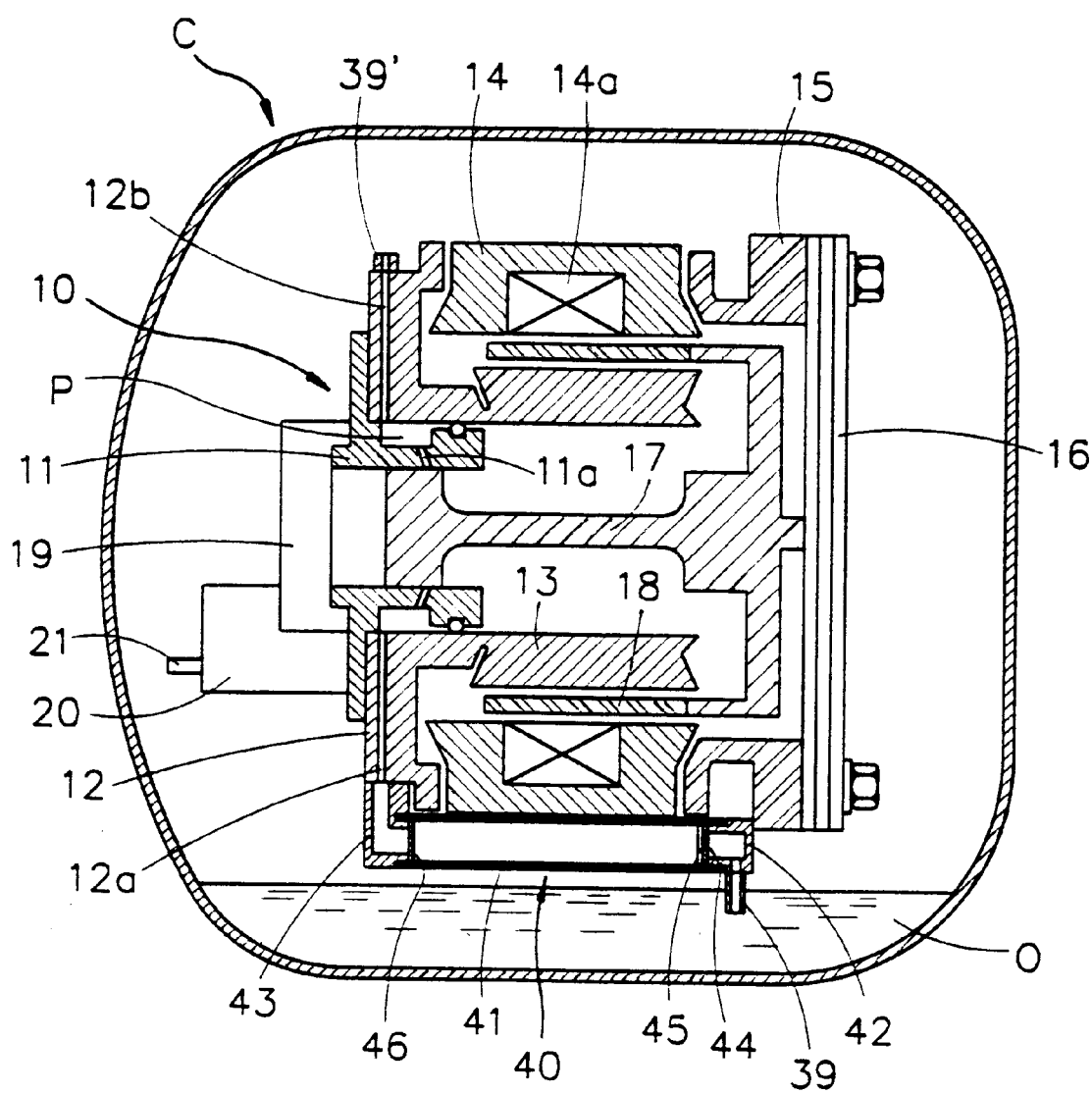
FIG. 4 is a vertical cross-sectional view of a linear compressor provided with an oil supply apparatus according to a first embodiment of the present invention.
Figure 5:
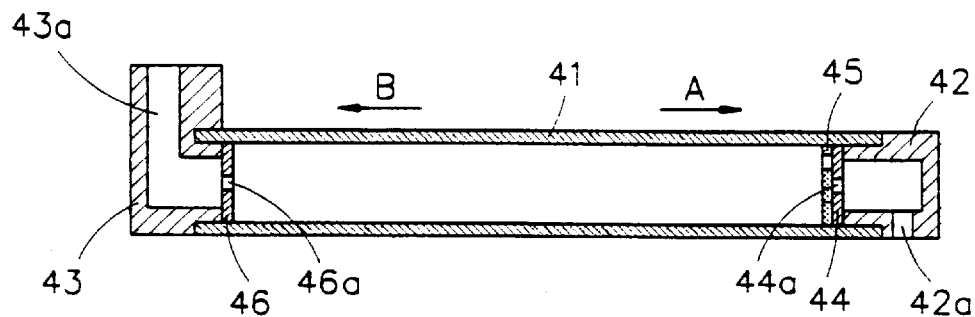
FIG. 5 is a vertical cross-sectional view of the oil supply apparatus is FIG. 4.

In FIGS. 4 and 5, a cylindrical oil supply pipe 41 containing oil is fixed to an outer side of a compressor unit 10, so that the oil supply pipe 41 may reciprocate in accordance with the vibration of the compressor unit 10. A first cover 42 which has an oil flow hole 42a at a predetermined portion thereof is fixed to an end portion of an oil flow side of the oil supply pipe 41. A flow stopper 44 has an oil flow hole 44a which communicates with the oil flow hole 42a of the first cover 42 and is compressedly inserted into the oil supply pipe 41 at an inner side of the first cover 42.

Figure 7:
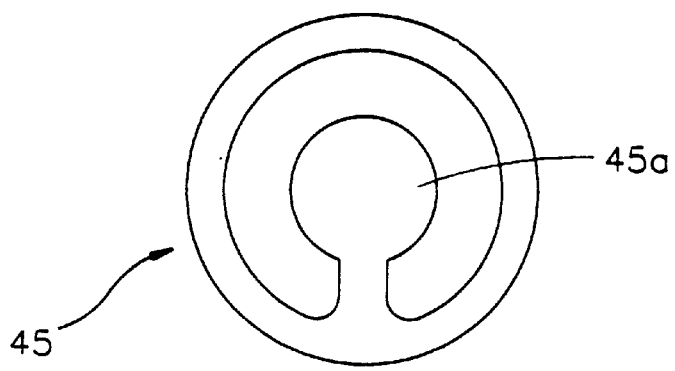
FIG. 7 is a front view of an oil flow valve of the oil supply apparatus in FIG. 5.

In FIG. 7, an flow valve 45 is tightly fixed to an inner side of the flow stopper 44, and opens/closes the oil flow hole 44a of the flow stopper 44 by which, in an oil flow state, a flow control unit 45a rotates at predetermined degrees of an angle with a center of a lower portion of the flow valve 45 in the center, towards an internal part of the oil supply pipe 41. Specifically, the flow control unit 45a is tightly fixed to the inner side of the flow stopper 44 and has a larger diameter than the oil flow hole 44a, so that the center portion thereof which corresponds to the oil flow hole 44a of the flow stopper 44 can be opened only in the oil flow state.

On the other side, a second cover 43 is fixed to an end portion of an exhaust side of the oil supply pipe 41 and has an oil exhaust hole 43a which communicates with an oil flow path 12a of a flange 12 communicating with an oil pocket P. The second cover 43 is fixed to the flange 12 by a plurality of bolts (not shown). An exhaust stopper 46 is compressively inserted into the oil supply pipe 41 at an inner side of the second cover 43, and has an oil exhaust hole 46a in the center thereof communicating with the oil exhaust hole 43a of the second cover 43.

The operation by which oil is flowed and exhausted in the oil supply unit which operates in accordance with the compressor unit in the oil supply apparatus for the linear compressor according to the first embodiment of the present invention is as follows.

Figure 6A:
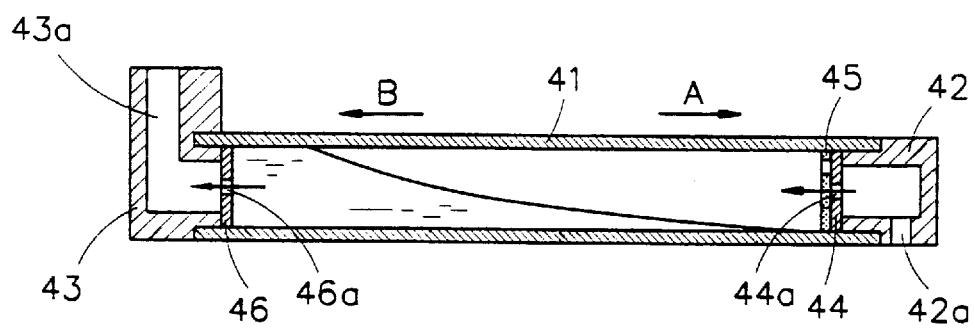
FIG. 6A is a vertical cross-sectional view illustrating an oil flow state of the oil supply apparatus in FIG. 5.
Figure 6B:
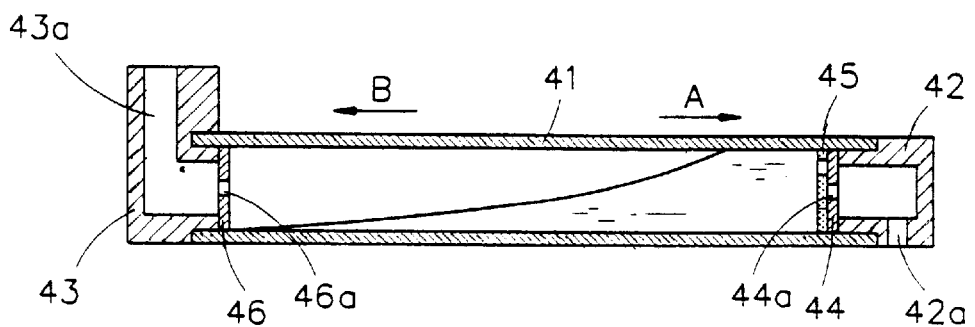
FIG. 6B is a vertical cross-sectional view illustrating an oil exhaust state of the oil supply apparatus in FIG. 5.

In FIGS. 6A and 6B, in accordance with the operation of the compressor, a piston 17 continuously reciprocates to compress a refrigerant gas, and thus the compressor unit 10 vibrates. The oil supply pipe 41 fixed at the outer side of the compressor unit 10 horizontally moves in accordance with the vibration of the compressor unit 10. Here, since oil is contained in the oil supply pipe 41, the oil receives inertia according to the horizontal-direction movement of the oil supply pipe 41. Thus, the oil in the oil supply pipe 41 is flowed and exhausted by proceeding to the opposite direction of the movement of the oil supply pipe 41.

FIG. 6A shows an oil flow state in the oil supply pipe according to the present invention.

As shown therein, when the oil supply pipe 41 moves in the direction of A, the oil contained therein has the inertia to keep its position while the oil supply pipe 41 moves in the right side, for thus the oil converges towards the left side, that is the direction B. At this time, a part of the oil which moves to the left side is exhausted out of the oil supply pipe. 41 through the oil exhaust hole 46a of the exhaust stopper 46.

The oil exhausted out of the oil supply pipe 41 sequentially passes through the oil exhaust hole 43a of the second cover 43 and an oil flow path 12a of the flange 12, and flows into the oil pocket P and finally to a friction portion between a cylinder 11 and a piston 17.

Since the pressure in the oil supply pipe 41 a low due to the oil exhausted out of the oil supply pipe 41, oil placed at an outer side of the oil supply pipe 41, which has higher pressure than the inner side of the oil supply pipe 41, tends to flow into the oil supply pipe 41 through the oil flow hole 42a of the first cover 42 and the oil flow hole 44a of the flow stopper 44.

Here, the flow control unit 45a formed in the center of the flow valve 45 rotates at predetermined degrees of an angle with the center of the lower portion of the flow valve 45 in the center, towards the internal part of the oil supply pipe 41, for thus the flow valve 45 is opened and certain amount of the oil placed at the outer side of the oil supply pipe 41 is flowed into the oil supply pipe 41.

On the other side, when the oil supply pipe 41 moves in the direction B, as shown in FIG. 6B, the oil contained therein converges in the direction A in FIG. 5 due to the inertia, and thus thrusts the flow control unit 45a of the flow valve 45 in the same direction, for thereby the flow valve 45 is closed to prevent oil from being flowed into the oil supply pipe 41.

Since the diameter of the flow control unit 45a is larger than that of the oil flow hole 44a of the oil flow stopper 44, and the flow control unit 45a can not rotate towards an outer part of the oil supply pipe 41, with the center of the lower portion of the flow valve 45 in the center, the flow valve 45 is closed by the movement of the flow control unit 45a.

Now, a second embodiment of an oil supply apparatus for a linear compressor according to the present invention will be described.

According to the first embodiment of the invention, a predetermined amount of oil, contained in the oil supply pipe which is hermetically sealed by the flow and the exhaust stoppers which have the flow and exhaust holes, respectively, is flowed and exhausted by inertia while the oil supply pipe horizontally moves in accordance with the vibration of the compressor unit. In addition, the oil supply apparatus has the flow valve in which the flow control unit is provided and which is tightly fixed to the inner side of the flow stopper to prevent the oil from being escaped again out of the first cover through the oil flow hole of the flow stopper when the oil supply pipe vibrates.

However, according to the second embodiment of the invention, the oil flow valve applied to the first embodiment of the invention is excluded and a plurality of fluid diodes, serving as the oil flow valve, are provided on an inner circumferential surface of an oil supply pipe.

Since the oil supply pipe applied to the second embodiment of the invention has the same structure as the first embodiment, except the internal structure of the oil supply pipe, the internal structure of the oil supply pipe will only be described.

Figure 8:
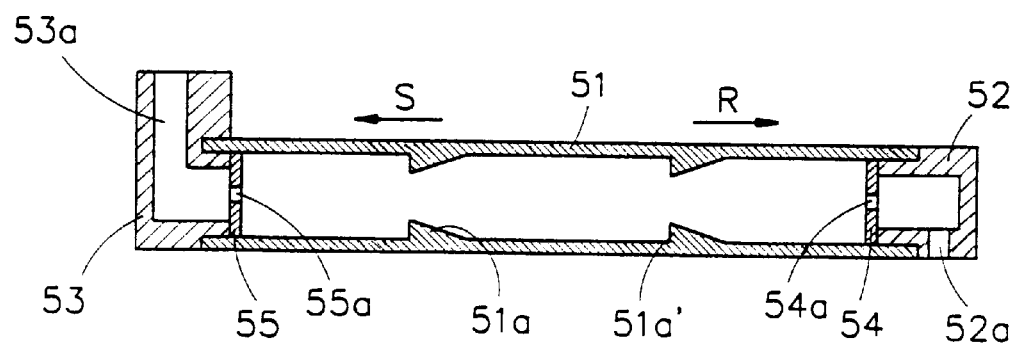
FIG. 8 is a vertical cross-sectional view of an oil supply apparatus for a linear compressor according to a a second embodiment of the present invention.

In FIG. 8, oil is contained in a cylindrical oil supply pipe 51 according to the second embodiment of the invention, and a plurality of the fluid diodes 51a, 51a' are provided on a portion of an inner circumferential surface of the oil supply pipe 51. A portion of each fluid diode which faces a side of the exhaust stopper is formed higher than the other side, thus the fluid diodes are respectively inclined, with the exhaust side being raised.

Figure 9A:
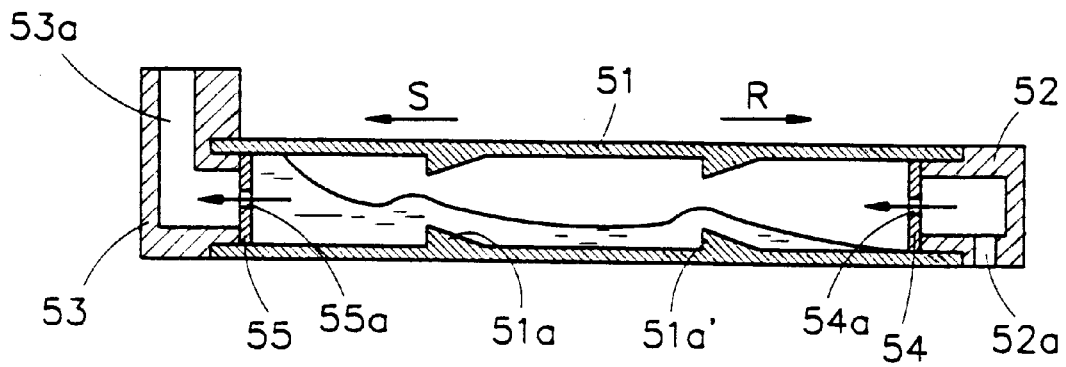
FIG. 9A is a vertical cross-sectional view illustrating an oil flow state of the oil supply apparatus in FIG. 8.

When the oil supply pipe 51 moves in the direction R, as shown in FIG. 9A, oil contained therein converges to the left side in FIG. 9A by inertia. Since the oil in the oil supply pipe 51 is easily moved to the left side in FIG. 9A, due to the tilted fluid diodes 51a, 51a' of which the portions facing the exhaust side are higher compared to the other portions, the oil concentrates upon the exhaust side of the oil supply pipe 51, that is the left side in FIG. 9A, and therefore a certain amount of the oil is exhausted out of the oil supply pipe 51 through an oil exhaust hole 55a provided in the center portion of an exhaust stepper 55.

Further, the exhausted oil passes through an oil exhaust hole 53a of an second cover 53 and the oil flow path 12a of the flange 12, for thereby being flowed into the oil pocket P and to the friction portion between the cylinder 11 and the piston 17.

Here, since the pressure in the oil supply pipe 51 reaches a low due to the oil exhausted out of the oil supply pipe 51, oil placed at an outer side of the oil supply pipe 51, the pressure of which is higher than the inner side of the oil supply pipe 51 is flowed into the oil supply pipe 51, through an oil flow hole 52a of a first cover 52 and an oil flow hole 54a of a flow stopper 54.

Figure 9B:
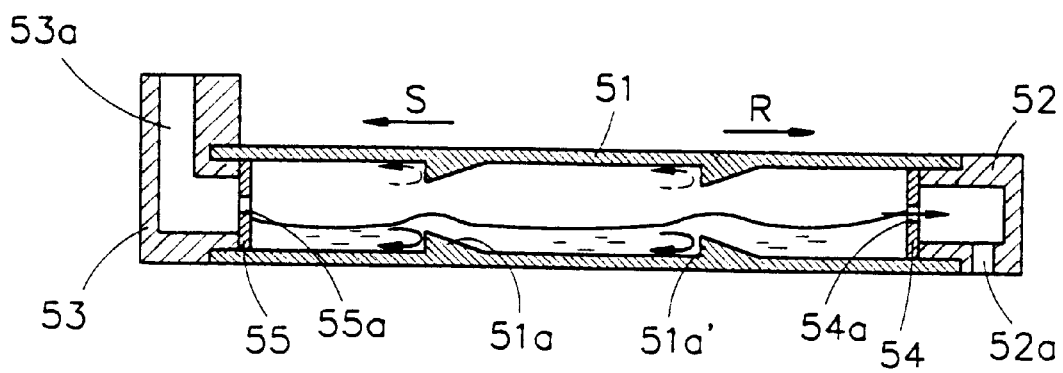
FIG. 9B is a vertical cross-sectional view illustrating an oil exhaust state of the oil supply apparatus in FIG. 8.

While, as shown in FIG. 9B, when the oil supply pipe 51 moves in the direction S, the oil filled therein converges to the right side. Here, the oil being moved to the right side generates eddies due to the inclined fluid diodes 51a, 51a', therefore the movement of the oil is partially deterred.

Accordingly, the continuous oil supply into the oil supply pipe becomes possible, since the amount of the oil flowed backward to the oil flow hole 54a of the flow stopper 54 is less than the oil flowed into the oil supply pipe 51 due to the movement of the oil supply pipe 51 in the direction R.

In addition, an oil supply apparatus according to a third embodiment of the invention may be possible although an accompanying drawing is not provided. Specifically, even small amounts of oil may be flowed and exhausted while moving horizontally by which a solid oil-mass is inserted in an oil supply pipe, which is movable therein and in which an oil path is provided in order not to block oil flow and exhaust holes of flow and exhaust stoppers.

As described above, the compressor unit is horizontally disposed in the hermetic vessel, and the oil supply unit is provided at the outer side of the compressor unit. The oil contained in the oil supply unit is exhausted by inertia and flowed into the oil pocket and into the friction portion between the cylinder and the piston in the process of which the oil supply unit reciprocates in accordance with the vibration of the compressor unit. Thus, the oil supply apparatus for the linear compressor according to the present invention has advantages of reducing manufacturing costs by excluding the elastic members and improving the productivity.

It will be apparent to those skilled in the art that various modifications and variations can be made in the oil supply apparatus for the linear compressor of the present invention without departing from the spirit or scope of the invention. Thus, it is intended that the present invention cover the modifications and variations of this invention provided they come within the scope of the appended claims and their equivalents.

What is claimed is:

1. An apparatus in the form of a linear compressor comprising a hermetic vessel, a compressor unit horizontally installed inside of the heretic vessel, a cylinder provided inside of the compressor unit and forming a cylindrical compression chamber, a piston disposed for reciprocation in the compression chamber, and an oil supply unit disposed at a lower portion of the compressor unit, wherein the improvement comprises:

an oil supply pipe containing oil and connected to the compressor unit;

a first cover fixed to an end portion of the oil supply pipe and having an oil flow hole;

a flow stopper fixed to an inner side of the first cover and inserted into the oil supply pipe;

an oil flow hole disposed at a center portion of the flow stopper to communicate with the oil flow hole of the first cover;

a flow valve fixed to an inner side of the flow stopper;

a flow control unit disposed at a center portion of the flow valve to selectively open/close the oil flow hole of the flow stopper;

a second cover fixed to the other end of the oil supply pipe;

an oil exhaust hole formed on the second cover and communicating with an oil path of a flange which is connected to an oil pocket;

an exhaust stopper fixed to an inner side of the second cover and inserted into the oil supply pipe; and an oil exhaust hole disposed at a center portion of the exhaust stopper to communicate with the oil exhaust hole of the second cover.

2. The apparatus of claim 1, wherein a diameter of the flow control unit is larger than a diameter of the oil flow hole of the flow stopper.

3. The apparatus of claim 1, wherein an oil mass having an oil path is provided in the oil supply pipe.

4. An apparatus in the form of a linear compressor comprising a hermetic vessel, a compressor unit horizontally installed inside of the heretic vessel, a cylinder provided inside of the compressor unit and forming a cylindrical compression chamber, a piston disposed for reciprocation in the compression chamber, and an oil supply unit disposed at a lower portion of the compressor unit, wherein the improvement comprises:

an oil supply pipe containing oil and connected to the compressor unit;

a plurality of fluid diodes on an inner circumferential surface of the oil supply pipe;

a first cover fixed to an end portion of the oil supply pipe and having an oil flow hole;

a flow stopper fixed to an inner side of the first cover and inserted into the oil supply pipe;

an oil flow hole disposed at a center portion of the flow stopper to communicate with the oil flow hole of the first cover;

a second cover fixed to the other end of the oil supply pipe;

an oil exhaust hole formed on the second cover and communicating with an oil path of a flange which is connected to an oil pocket;

an exhaust stopper fixed to an inner side of the second cover and inserted into the oil supply pipe; and an oil exhaust hole disposed at a center portion of the exhaust stopper to communicate with the oil exhaust hole of the second cover.

5. The apparatus of claim 4, wherein each of the fluid diode is inclined towards the exhaust stopper.

6. The apparatus of claim 4, wherein an oil mass having an oil path is inserted into the oil supply pipe.

* * * * *